(12) United States Patent
Kato et al.

(10) Patent No.: US 8,154,639 B2
(45) Date of Patent: Apr. 10, 2012

(54) SOLID STATE IMAGING APPARATUS AND METHOD OF DRIVING THE SAME

(75) Inventors: Satoshi Kato, Kawasaki (JP); Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 12/698,279

(22) Filed: Feb. 2, 2010

(65) Prior Publication Data

US 2010/0214463 A1 Aug. 26, 2010

(30) Foreign Application Priority Data

Feb. 25, 2009 (JP) ................................. 2009-042898

(51) Int. Cl.
*H04N 3/14* (2006.01)
*H04N 5/335* (2011.01)
*H01L 27/00* (2006.01)

(52) U.S. Cl. ...... 348/302; 348/294; 348/308; 250/208.1

(58) Field of Classification Search .......... 348/294–324; 250/206, 208.1

See application file for complete search history.

(56) References Cited

U.S. PATENT DOCUMENTS

| | | | | |
|---|---|---|---|---|
| 7,598,992 B2 * | 10/2009 | Matsuda | ...................... | 348/294 |
| 7,633,540 B2 | 12/2009 | Totsuka | ...................... | 348/294 |
| 7,746,399 B2 * | 6/2010 | Itoh et al. | ...................... | 348/302 |
| 7,750,961 B2 * | 7/2010 | Matsuda | ...................... | 348/308 |
| 7,855,742 B2 * | 12/2010 | Oshima et al. | ................ | 348/294 |
| 7,875,839 B2 * | 1/2011 | Sato et al. | .................. | 250/208.1 |
| 8,059,172 B2 * | 11/2011 | Kondo | ......................... | 348/241 |
| 2008/0036890 A1 | 2/2008 | Yamashita et al. | ............ | 348/308 |
| 2009/0115876 A1 | 5/2009 | Totsuka | ........................ | 348/294 |
| 2009/0141157 A1 | 6/2009 | Kobayashi et al. | ........... | 348/308 |
| 2009/0200449 A1 | 8/2009 | Iwata et al. | .................... | 250/206 |
| 2009/0322922 A1 | 12/2009 | Saito et al. | .................... | 348/308 |
| 2010/0006743 A1 | 1/2010 | Kato et al. | ................. | 250/208.1 |
| 2010/0073537 A1 | 3/2010 | Kato et al. | .................... | 348/300 |
| 2010/0079648 A1 | 4/2010 | Totsuka et al. | ................ | 348/308 |

FOREIGN PATENT DOCUMENTS

JP 2007-194720 A 8/2007

* cited by examiner

*Primary Examiner* — Jason Chan
*Assistant Examiner* — Pritham Prabhakher
(74) *Attorney, Agent, or Firm* — Fitzpatrick, Cella, Harper & Scinto

(57) ABSTRACT

In a solid-state imaging apparatus, during a horizontal scanning period, a pixel signal is written in a first holding unit, while a horizontal scanning circuit outputs, to the horizontal common output line, the other pixel signal held by a second holding unit. And, a transition time of an edge of a sampling pulse during the horizontal scanning period is set longer than a transition time of an edge of the sampling pulse during a time period other than the horizontal scanning period.

5 Claims, 15 Drawing Sheets

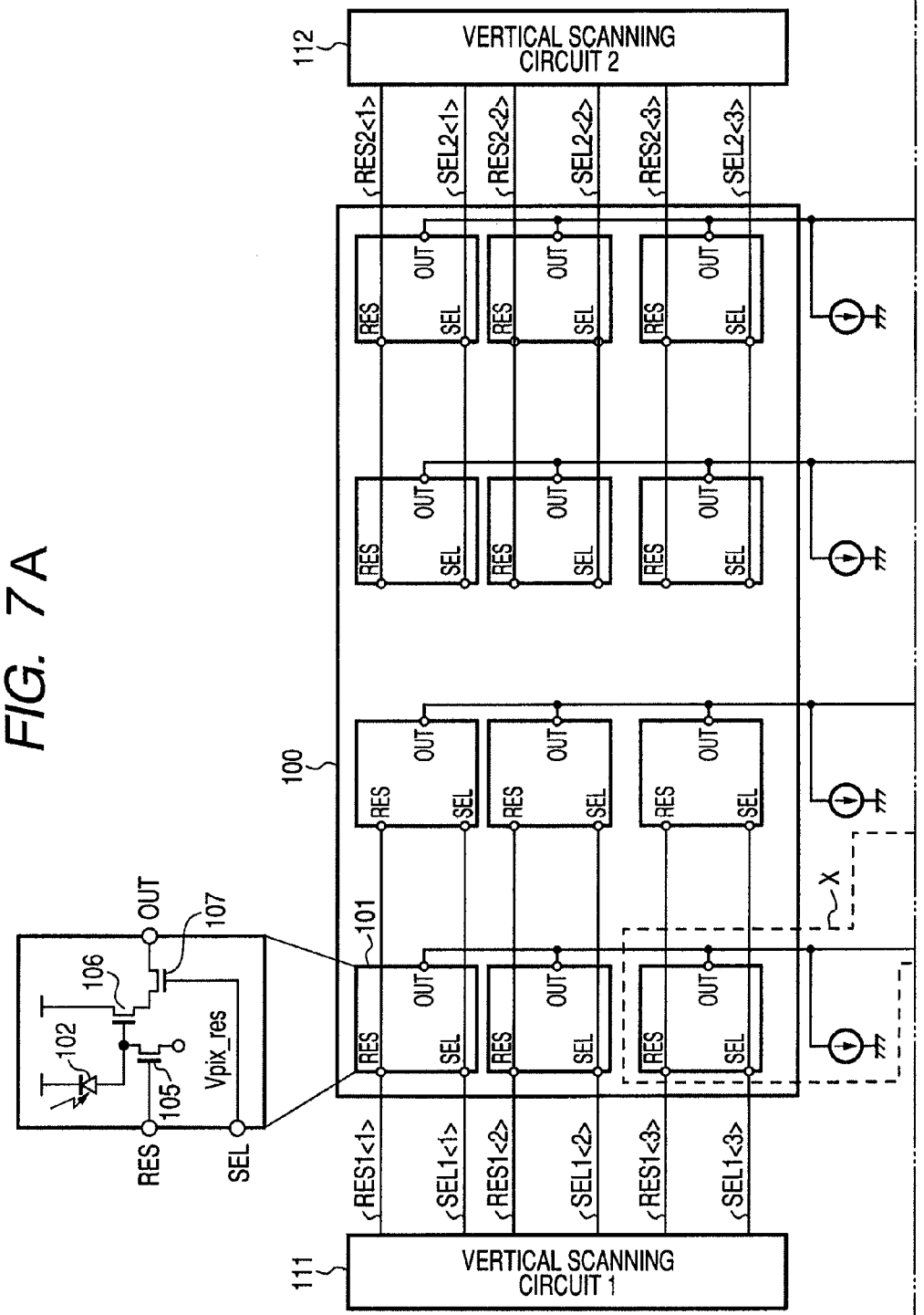

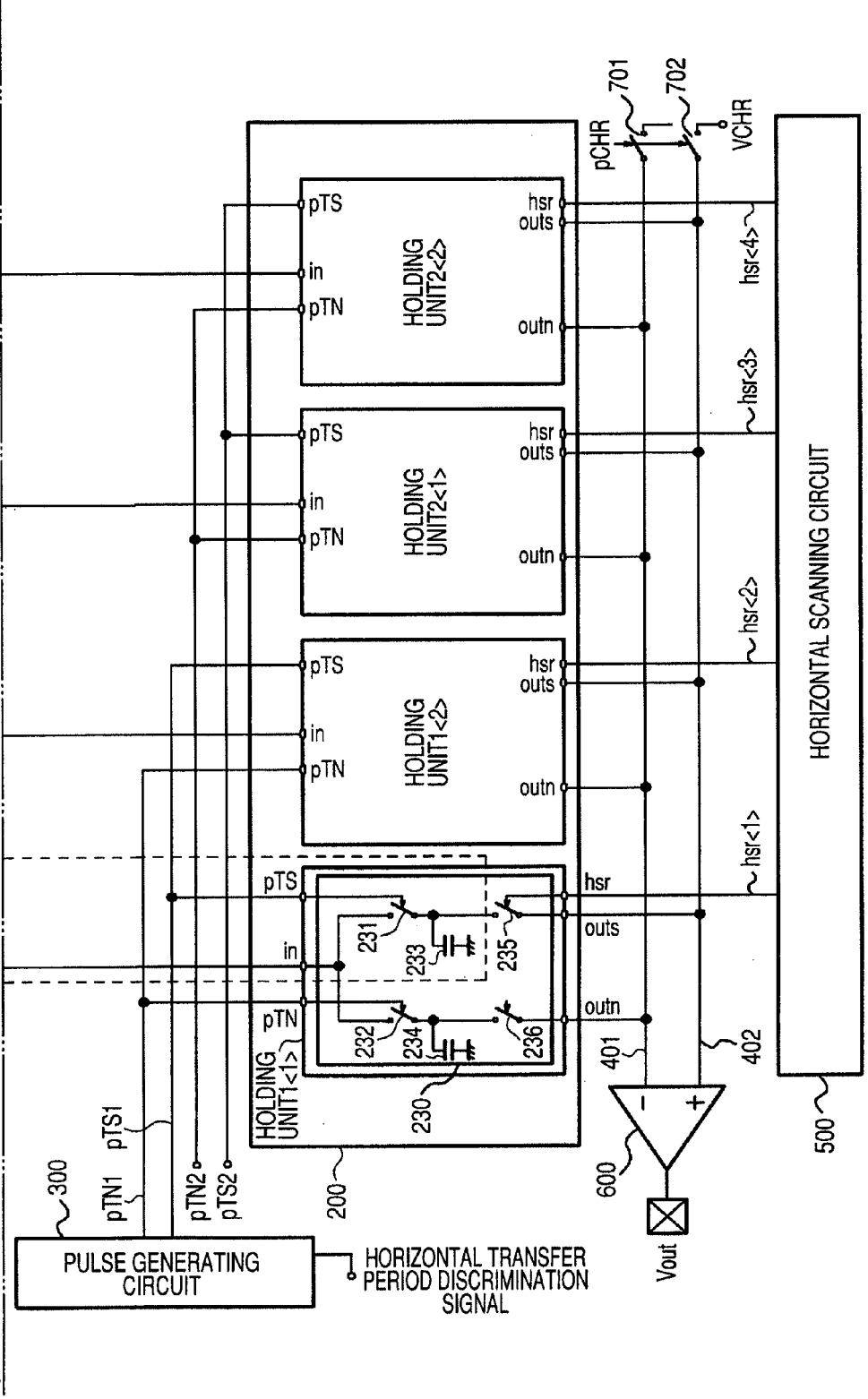

(FIG. 10B CONTINUED)

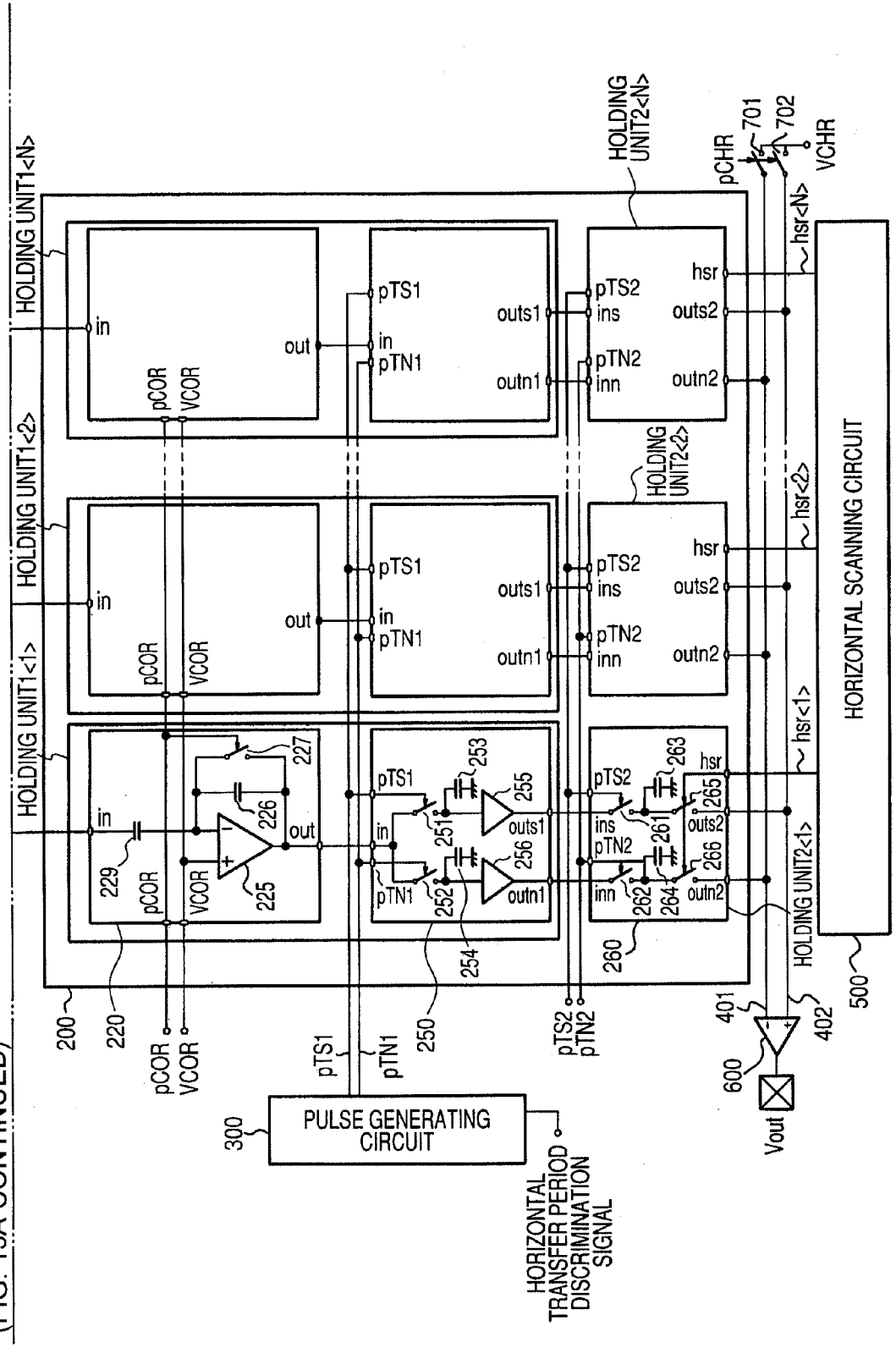

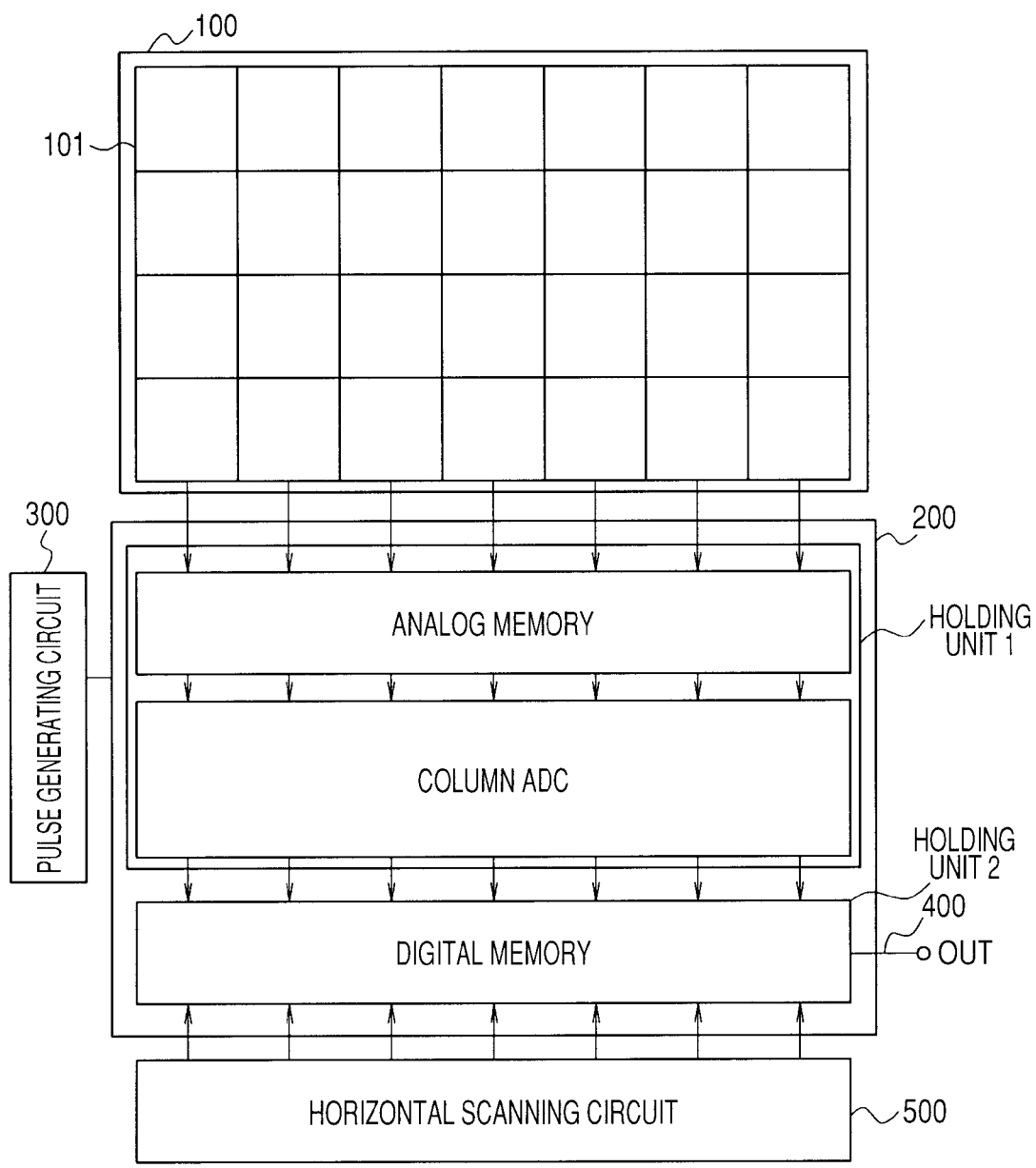

SOLID STATE IMAGING APPARATUS AND METHOD OF DRIVING THE SAME

BACKGROUND OF THE INVENTION

1. Field of the Invention

The present invention relates to a solid-state imaging apparatus used for a scanner, a video camera, a digital still camera, and the like, and to a method of driving the solid-state imaging apparatus.

2. Description of the Related Art

In recent years, there has been a request for increasing the number of pixels in a CMOS solid-state imaging apparatus. When the number of pixels is increased, the number of pixels to be read during one horizontal scanning period is increased, so that the reading speed of pixel signals needs to be increased. The techniques to cope with the increase in the reading speed include a method disclosed in Japanese Patent Application Laid-Open No. 2007-194720 (hereinafter referred to as Patent Document 1).

In Patent Document 1, it is described that the image reading speed can be increased by reducing the vertical transfer wait period in such a manner that pixels of a solid-state imaging apparatus are divided into first and second groups, and that while output signals from one pixel group are vertically transferred, output signals from the other pixel group are horizontally transferred.

However, the solid-state imaging apparatus, to which the above described reading method is applied, has the following problems.

As described above, the horizontal transfer and the vertical transfer are simultaneously performed in the method disclosed in Patent Document 1. In the configuration described in Patent Document 1, a noise generated in synchronization with a sampling pulse of a sampling and holding circuit in each holding unit may be superimposed on a pixel signal during the horizontal transfer, so as to deteriorate the image quality. When the current flowing through the power supply path is rapidly changed in association with the sampling operation of the pixel signal in the holding unit, the power supply voltage is changed due to the parasitic impedance, such as an inductance component of a bonding wire, and the like, on the power supply path. The above described noise is caused by the change in the power supply voltage being transmitted to the reading circuit. Therefore, the noise tends to be increased, as the holding capacitor to be simultaneously driven is increased so as to thereby increase the magnitude of transient change caused in the charge and discharge current of the holding capacitor during the sampling operation. As the number of pixels is increased to thereby increase the holding capacitor, the influence of the holding capacitor appears as a more serious problem.

As a method to suppress the noise, a method to increase the transition time (rising time and decaying time) of the sampling pulse is considered. The dulling of the sampling pulse corresponds to that the on-resistance of the switch in the sampling and holding circuit configured by a MOS transistor is reduced at low speed. By using the method, the rapid change, which is caused in the current flowing into the holding capacitor via the switch to cause the noise, can be suppressed, so that the noise can be suppressed.

However, as described in Patent Document 1, when the vertical transfer period exists in a period other than the horizontal transfer period, and when the sampling pulse is uniformly dulled by means of the above described measure, the vertical transfer period is increased, so that the blanking period is increased. When the blanking period is increased, the horizontal transfer period is reduced. Therefore, the horizontal transfer needs to be performed at higher speed, so that a higher drive speed of the reading circuit is required.

SUMMARY OF THE INVENTION

The present invention has been made in view of the above described problems. An object of the present invention is to provide a solid-state imaging apparatus and a method of driving the solid-state imaging apparatus, which are capable of suppressing a noise generated in synchronization with a sampling pulse during a vertical transfer period without increasing a blanking period.

In order to achieve the above object, a solid-state imaging apparatus according to the present invention comprises: a plurality of pixels each including a photoelectric conversion unit for generating a pixel signal by photoelectric conversion; a pulse generator circuit for generating a sampling pulse; a holding circuit including first and second holding units for holding the pixel signal according to the sampling pulse; and a horizontal scanning circuit for outputting, to a horizontal common output lines, the pixel signal held by the holding circuit, wherein a horizontal scanning period starts from outputting a first one of the pixel signals from the holding circuit to the horizontal scanning circuit until an end of the outputting a last one of the pixel signals, during the horizontal scanning period, while the pixel signal is written in the first holding unit, the horizontal scanning circuits outputs, to the horizontal common output lines, the other pixel signal held by the second holding unit, and a transition time of an edge of the sampling pulse during the horizontal scanning period is set to be longer than a transition time of the edge of the sampling pulse during a time period except for the horizontal scanning period.

Other features and advantages of the present invention will be apparent from the following description taken in conjunction with the accompanying drawings, in which like reference characters designate the same or similar parts throughout the figures thereof.

Further features of the present invention will become apparent from the following description of exemplary embodiments with reference to the attached drawings.

BRIEF DESCRIPTION OF THE DRAWINGS

FIG. 7A and FIG. 7B together form FIG. 7, which shows a block diagram illustrating in detail an example of the system configuration of FIG. 1.

FIG. 13A and FIG. 13B together form FIG. 13, which shows a schematic block diagram illustrating a configuration example of a solid-state imaging apparatus according to a third embodiment of the present invention.

FIG. 15 is a block diagram illustrating a configuration example of a solid-state imaging apparatus which is assumed to have digital outputs.

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

Figure 1:
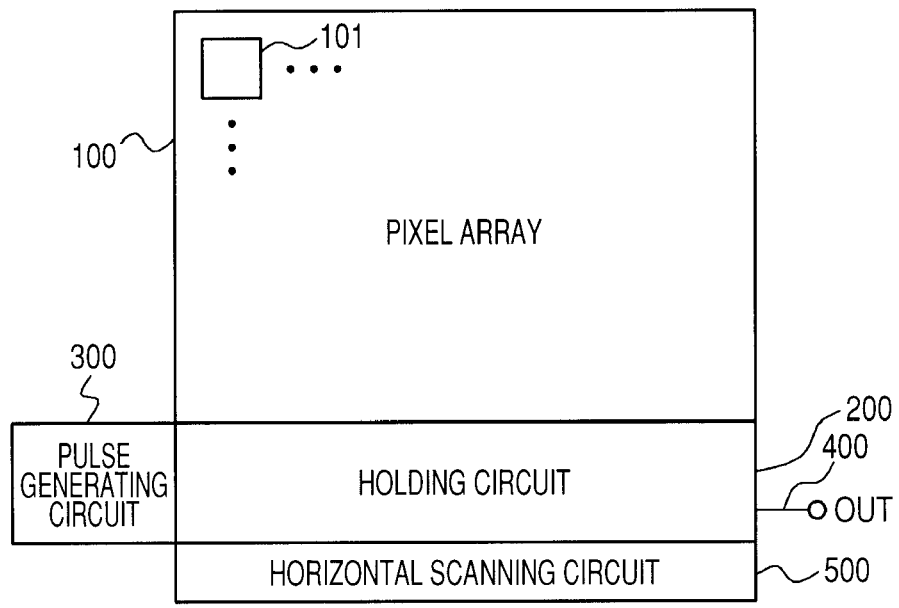
FIG. 1 is a block diagram of a solid-state imaging apparatus according to a first embodiment of the present invention.

FIG. 1 is a block diagram of a solid-state imaging apparatus according to a first embodiment of the present invention. A pixel array 100 is configured by a plurality of pixels 101. A holding circuit 200 is configured by first and second holding units for holding pixel signals input from the pixel array 100. A pulse generator circuit 300 generates a sampling pulse used in the holding circuit 200. A horizontal common output line 400 outputs the pixel signals held in the holding circuit 200 to the outside. A horizontal scanning circuit 500 transfers the pixel signals from the holding circuit 200 to the horizontal common output line 400.

Figure 2:
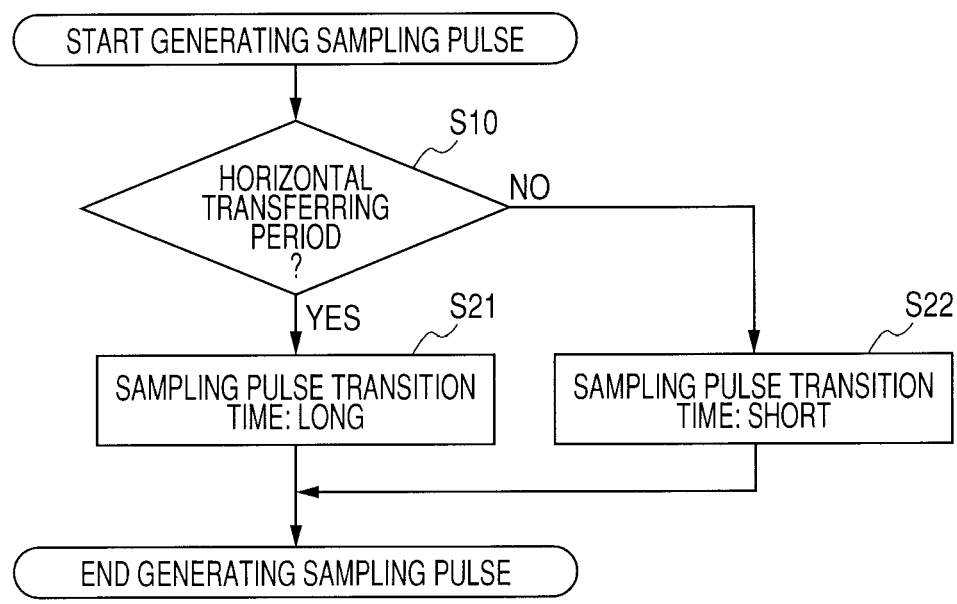
FIG. 2 is a flow chart illustrating an operation of a pulse generator circuit of FIG. 1.
Figure 3:
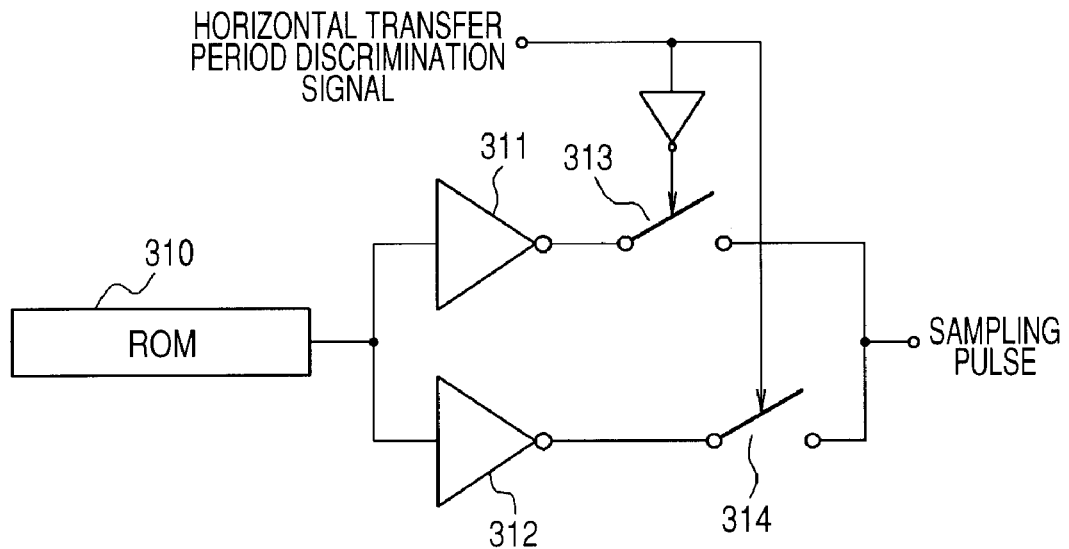
FIG. 3 is a circuit diagram illustrating a first configuration example of the pulse generator circuit of FIG. 1.

FIG. 2 is a flow chart describing an operation of the pulse generator circuit 300 of FIG. 1. In FIG. 2, when the generation of the sampling pulse is started, the pulse generator circuit 300 first discriminates whether or not the present time is in a horizontal transfer period (step S10). Note that the "horizontal transfer period" in the present embodiment means a period from the time when the transfer operation (hereinafter referred to as horizontal transfer) of the first one of the pixel signals from the holding circuit 200 to the horizontal common output line 400 is started to the time when the horizontal transfer of the last one of the pixel signals is completed. This is also the same for the following embodiments. When it is discriminated in step S10 that the present time is in the horizontal transfer period, the pulse generator circuit 300 generates a sampling pulse having a long transition time (step S21). When it is discriminated in step S10 that the present time is not in the horizontal transfer period, the pulse generator circuit 300 generates a sampling pulse having a short transition time (step S22). Thereafter, the pulse generator circuit 300 outputs the sampling pulse generated in step S21 or step S22 to the holding circuit 200.

In this way, the transition time of the sampling pulse during the horizontal transfer period is increased, so that it is possible to suppress a noise which is generated in synchronization with the sampling pulse at the time of vertical transfer. Further, even when a high-speed pulse is input by reducing the transition time in a period other than the horizontal transfer period, since the horizontal transfer is not performed, the noise, which is caused by the sampling pulse and which is originated from the power supply system, is not superimposed on the pixel signal during the horizontal transfer. Thereby, it is possible to transition the pulse at high speed during the period other than the horizontal transfer period, so that the blanking period is reduced.

As described above, according to the present embodiment, the transition time of the sampling pulse is increased during the horizontal transfer period, and the transition time of the sampling pulse is reduced during a period other than the horizontal transfer period. Thereby, the blanking period can be suppressed to be short, and the noise generated in synchronization with the sampling pulse at the time of vertical transfer can be suppressed.

FIGS. 3 to 6 show examples of the pulse generator circuit 300 of FIG. 1. In the circuit shown in FIG. 3, a signal from a ROM (read-only memory) 310 is first input into inverters 311 and 312 used as buffers. In the inverters 311 and 312, the inverter 311 has a higher drive power than the inverter 312, and hence outputs a pulse with a short transition time. On the contrary, the inverter 312 has a low drive power, and hence outputs a pulse with a long transition time according to the input signal. Changeover switches 313 and 314 controlled by a horizontal transfer period discrimination signal are connected to the subsequent stages of the inverters 311 and 312, respectively. Here, the horizontal transfer period is defined as a period during which the horizontal transfer period discrimination signal is set at a high level (the same is applied to the followings). In this case, during the horizontal transfer period, the switch 314 is turned on, and the switch 313 is turned off. As a result, a pulse which is driven by the inverter 312 and which has a long transition time is output as the sampling pulse to the holding circuit 200 (corresponding to S21 in FIG. 2). Further, during a period other than the horizontal transfer period, the switch 313 is turned on, and the switch 314 is turned off. As a result, a sampling pulse having a short transition time is output by the inverter 311 to the holding circuit 200 (corresponding to S22 in FIG. 2).

Figure 4:
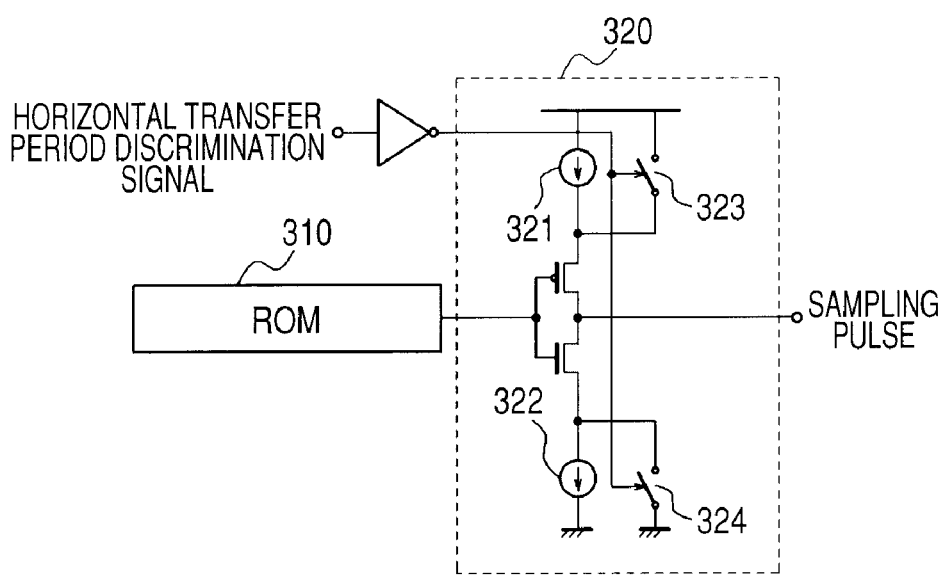
FIG. 4 is a circuit diagram illustrating a second configuration example of the pulse generator circuit of FIG. 1.

In FIG. 4, during the horizontal transfer period, a buffer circuit 320 is operated as a circuit, the transition time of which is controlled by current sources 321 and 322. On the other hand, during a period other than the horizontal transfer period, the changeover switches 323 and 324 are turned on to allow the buffer circuit 320 to be operated as a normal inverter. The operation shown in FIG. 2 can be realized by setting the current of the current sources 321 and 322 to current values which increase the transition time of the sampling pulse during the horizontal transfer period.

Figure 5:
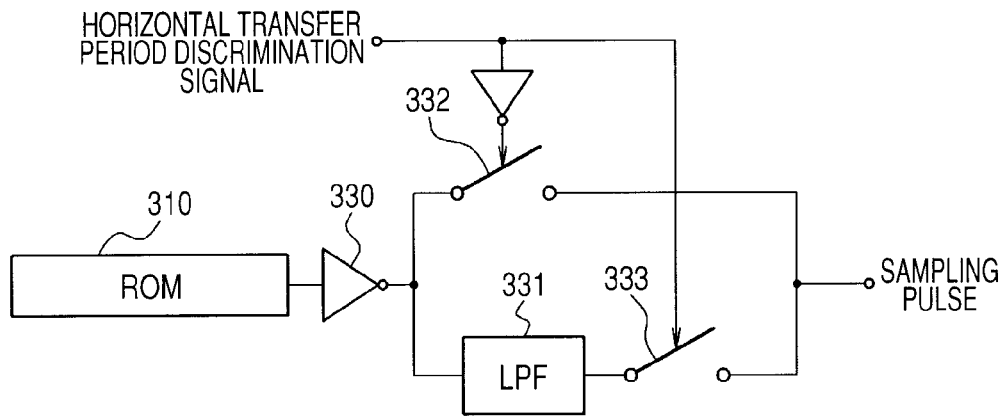
FIG. 5 is a circuit diagram illustrating a third configuration example of the pulse generator circuit of FIG. 1.

In the circuit shown in FIG. 5, the operation shown in FIG. 2 is realized by controlling the changeover switches 332 and 333 so that the output from an inverter 330 is output via an LPF (low pass filter) 331 only during the horizontal transfer period. When the switch 332 is turned on, and when the switch 333 is turned off, the pulse generator circuit 300 outputs the sampling pulse having a short transition time. Further, when the switch 332 is turned off, and when the switch 333 is turned on, the pulse generator circuit 300 outputs the sampling pulse having a long transition time by using the LPF 331.

Figure 6:
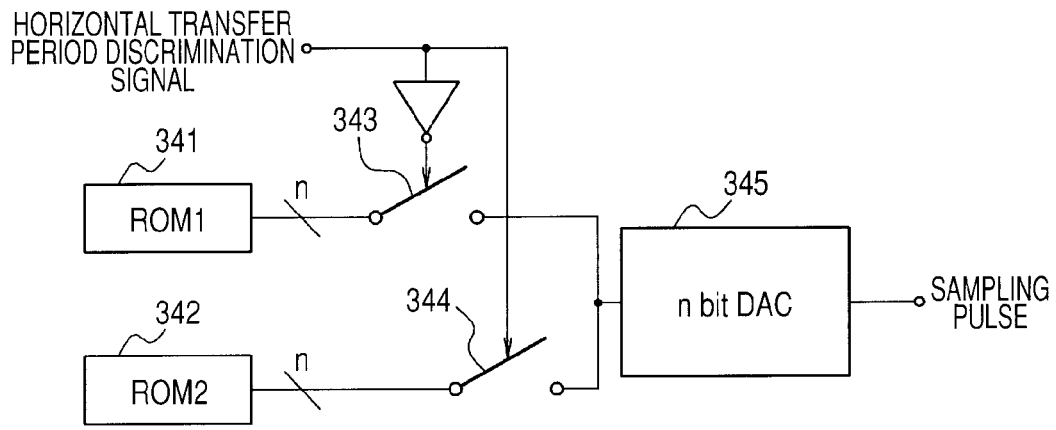
FIG. 6 is a circuit diagram illustrating a fourth configuration example of the pulse generator circuit of FIG. 1.

In FIG. 6, the operation shown in FIG. 2 is realized in such a manner that the connection from a first ROM 341 to the input of a DAC (digital-to-analog converter) 345 and the connection from a second ROM 342 to the input of the DAC 345 are switched by changeover switches 343 and 344 so as to correspond to the horizontal transfer period and a period other than the horizontal transfer period. During the period other than the horizontal transfer period, data of the sampling pulse having a short transition time is input into the DAC 345 from the first ROM 341, while during the horizontal transfer period, data of the sampling pulse having a long transition time is input into the DAC 345 from the second ROM 342.

It has been described that the operation shown in FIG. 2 can be realized by using the circuit as shown in FIGS. 3 to 6, but the present embodiment is not limited to this. The effect of the present embodiment can be similarly obtained even by using a circuit other than the circuits shown here, if the other circuit is capable of realizing the operation shown in FIG. 2.

FIG. 7 is a circuit configuration diagram showing in detail an example of the block diagram of FIG. 1. In FIG. 7, a pixel array 100 is configured by pixels 101 arranged in three rows and four columns. The pixel 101 is configured by a PD (photodiode) 102, a reset Tr (transistor) 105 for resetting the pixel to pixel reset potential Vpix_res, an input Tr 106 serving as a source follower amplifier, and a selection Tr 107. The PD 102 is a photoelectric conversion unit which generates a pixel signal by photoelectric conversion. The pixels 101 of the first and the second columns are controlled by a first vertical scanning circuit 111, while the pixels 101 of the third and the fourth columns are controlled by a second vertical scanning circuit 112.

The signal from the pixel 101 is held in the holding circuit 200. The holding circuit 200 is configured by two holding units 1 respectively provided for the first and second columns, and two holding units 2 respectively provided for the third and fourth columns. Each of the holding unit 1 and the holding unit 2 is configured by a line memory 230.

The line memory 230 has a sampling switch 231 controlled by a sampling pulse pTS, and a pixel signal holding capacitor 233 (Cts) for holding the pixel signal of the pixel 101. Further, the line memory 230 has a sampling switch 232 controlled by a sampling pulse pTN, and a noise signal holding capacitor 234 (Ctn) for holding the reset signal of the pixel. The signals held in the holding capacitors 233 and 234 are horizontally transferred to horizontal common output lines 401 and 402 via horizontal transfer switches 235 and 236, each of which is similarly provided in the line memory 230, and each of which is controlled by a signal from the horizontal scanning circuit 500.

Horizontal common output line reset switches 701 and 702 controlled by a signal pCHR, and a differential amplifier circuit 600 are connected to the horizontal common output lines 401 and 402. The differential amplifier circuit 600 takes a difference between the pixel signal of the pixel 101 and the reset signal, so as to amplify the difference, and then outputs the resultant pixel signal to the outside of the chip.

Figure 8:
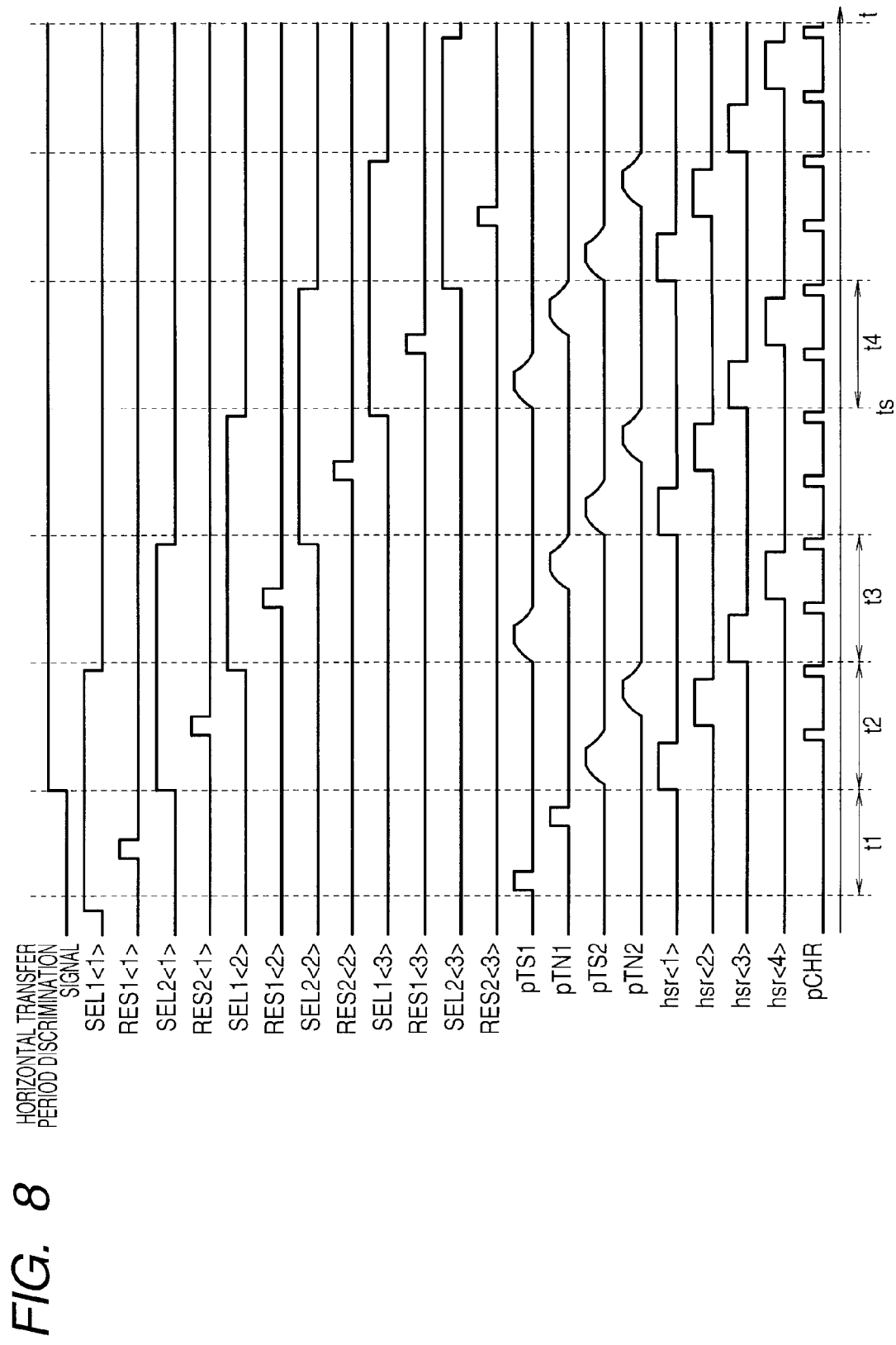
FIG. 8 is a timing chart of the operation of the circuit of FIG. 7.

FIG. 8 is a drive timing chart showing a driving method of the solid-state imaging apparatus of FIG. 7. In FIG. 8, the vertical transfer operation, in which the pixel signals and the reset signals of the pixels 101 of the first and second columns of the first row are respectively sampled and held in holding capacitors 233 and 234 of the holding unit 1<1> and the holding unit 1<2>, is performed during the period of t1.

The above described vertical transfer operation will be described in detail. The PD 102 in the pixel 101 generates electric charges by photoelectric conversion and accumulates the electric charges so as to output a pixel signal. When a signal SEL1<1> is set to the high level, the selection Tr 107 of each of the pixels 101 of the first and second columns of the first row is turned on, so that the pixels 101 of the first and second columns output the pixel signals to the holding unit 1<1> and the holding unit 1<2>, respectively. When a sampling pulse pTS1 is set to the high level, the sampling switch 231 is turned on, so that the pixel signal is sampled and held in the pixel signal holding capacitor 233 of each of the holding unit 1<1> and the holding unit 1<2>. Next, when a signal RES1<1> is set to the high level, the reset Tr 105 of the pixel 101 of each of the first and second columns of the first row is turned on, so that the pixel signal of the PD 102 is reset. Next, when a sampling pulse pTN1 is set to the high level, the sampling switch 232 is turned on, so that the noise signal is sampled and held in the noise signal holding capacitor 234 of each of the holding unit 1<1> and the holding unit 1<2>.

During the period of t2, the signals of the pixels 101 held in the holding unit 1<1> and the holding unit 1<2> are horizontally transferred. At the same time, the pixel signals and the reset signals of the pixels 101 of the third and fourth columns of the first row are vertically transferred to the holding unit 2<1> and the holding unit 2<2>.

First, the above described horizontal transfer will be described in detail. When a horizontal transfer signal hsr<1> is set to the high level, the horizontal transfer switches 235 and 236 in the holding unit 1<1> are turned on. Then, the pixel signal of the pixel signal holding capacitor 233 in the holding unit 1<1> is output to the horizontal common output line 402, and the noise signal of the noise signal holding capacitor 234 in the holding unit 1<1> is output to the horizontal common output line 401. The differential amplifier circuit 600 takes a difference between the pixel signal on the horizontal common output line 402, and the reset signal on the horizontal common output line 401, and outputs the resultant pixel signal to the outside of the chip. Next, when a horizontal transfer signal hsr<2> is set to the high level, the horizontal transfer switches 235 and 236 in the holding unit 1<2> are turned on. Then, the pixel signal of the pixel signal holding capacitor 233 in the holding unit 1<2> is output to the horizontal common output line 402, and the noise signal of the noise signal holding capacitor 234 in the holding unit 1<2> is output to the horizontal common output line 401. The differential amplifier circuit 600 takes a difference between the pixel signal on the horizontal common output line 402, and the reset signal on the horizontal common output line 401, and outputs the resultant pixel signal to the outside of the chip.

Next, the above described vertical transfer will be described in detail. When a signal SEL2<1> is set to the high level, the selection Tr 107 of each of the pixels 101 of the third and fourth columns of the first row is turned on, and the pixel signals of the pixels 101 of the third and fourth columns are output to the holding unit 2<1> and the holding unit 2<2>. When a sampling pulse pTS2 is set to the high level, the sampling switch 231 is turned on, so that the pixel signal is sampled and held in the pixel signal holding capacitor 233 of each of the holding unit 2<1> and the holding unit 2<2>. Next, when a signal RES2<1> is set to the high level, the reset Tr 105 of each of the pixels 101 of the third and fourth columns of the first row is turned on, so that the pixel signal of the PD 102 is reset. Next, when a sampling pulse pTN2 is set to the high level, the sampling switch 232 is turned on, so that the noise signal is sampled and held in the noise signal holding capacitor 234 of each of the holding unit 2<1> and the holding unit 2<2>.

During the period of t3, in parallel with the horizontal transfer operation from the holding unit 2<1> and holding section 2<2>, the vertical transfer operation to the holding unit 1<1> and the holding unit 1<2> is performed for the first and second columns of the second row.

In this way, the vertical transfer and the horizontal transfer to and from the holding unit 1 and the holding unit 2 are alternately performed in the solid-state imaging apparatus shown in FIG. 7. Thus, while the horizontal transfer from one of the holding units is performed, the vertical transfer to the other holding unit is performed.

During the period of t1, the horizontal transfer period discrimination signal is set to a low level, and hence the period is not the horizontal transfer period. During the periods of t2, t3 and t4, the horizontal transfer period discrimination signal is set to the high level, and hence the periods are the horizontal transfer period. The transition time of sampling pulses pTS1, pTN1, pTS2 and pTN2, which transition during the horizontal transfer period as shown in the period of t2 and t3, is set long in order to suppress a noise caused by a power supply voltage change generated in synchronization with these sampling pulses. On the other hand, during the period of t1 in which the horizontal transfer is not performed, the transition time of the sampling pulses pTS1 and pTN1 is set short. Even when the transition time of the sampling pulse that transitions during the period in which the horizontal transfer is not performed is set short, since the horizontal transfer is not performed, the noise caused by the power supply voltage change generated during the blanking period, is not superimposed on the output signal. Therefore, as for the pulse, as represented by pTS1 and pTN1 during the periods of t1 and t3, which transitions both during the horizontal transfer period and during a period other than the horizontal transfer period, the transition time of the pulse can be set long during the horizontal transfer period, and the transition time of the pulse can be set short during the period other than the horizontal transfer period. Thereby, the noise generated in synchronization with the sampling pulse for the vertical transfer can be suppressed without increasing the blanking period.

Further, the above described noise tends to be increased as the holding capacitor to be driven is increased and as the difference between the signal level to be sampled and the initial value of the holding capacitor is increased. This is because these conditions increase the charge and discharge current generated at the time of the sampling operation. For this reason, it is preferred that the transition time of the sampling pulse which controls the sampling operation under such conditions is set to be particularly long. On the contrary, the transition time of the sampling pulse having small noise influence need not necessarily be increased. An example of the method to determine the transition time of the sampling pulse will be described below.

Figure 9:
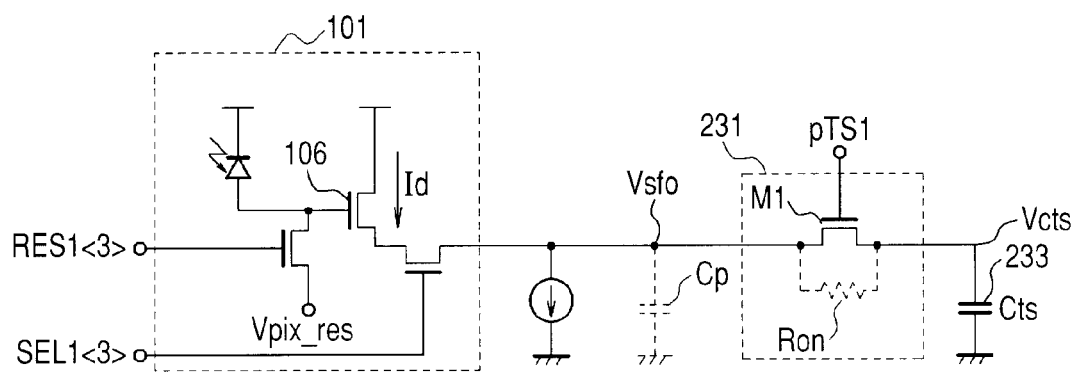
FIG. 9 is a circuit diagram illustrating the portion surrounded by broken line X in FIG. 7.

FIG. 9 is a circuit diagram shown by paying attention to the region surrounded by the broken line X in FIG. 7. In the period of t4 in FIG. 8, the time when the sampling pulse pTS1 starts to transition to the high level is set as ts. In this case, when t=ts, the pixel signal Vs of the pixel 101 of the first column of the third row is held in the parasitic capacitor Cp at the output of the pixel source follower (Vsfo(ts)=Vs). Note that it is assumed here that the influence of the substrate bias effect is neglected, and that the amplification ratio of the source follower is one. Further, when t=ts, an initial value Vcts0 is held as the initial value in the pixel signal holding capacitor 233 (Vcts(ts)=Vcts0), and it is assumed that Vs>Vcts0.

When t>ts, as the sampling pulse pTS1 transitions to the high level, the on-resistance Ron of the sampling switch 231 configured by an nMOS transistor M1 is reduced according to the voltage level of the sampling pulse pTS1. Thereby, the charges of the parasitic capacitor Cp start to move to the pixel signal holding capacitor 233. The voltage Vsfo is reduced as the charges in the parasitic capacitor Cp are reduced by the movement of the charges, and a voltage Vgs applied across the input Tr 106 is increased. Thereby, the drain current Id of the input Tr 106 is increased, so that the amount of current flowing through the power supply is changed. The amount of change in the power supply voltage can be calculated from the amount of change in the current at this time and the parasitic impedance of the power supply. As described above, the change in the power supply voltage becomes a noise to be superimposed on the output signal. Thus, the noise can be suppressed by setting the transition time so that the amount of change in the current is limited so as to suppress the change in the power supply voltage to a predetermined level.

In this way, the transition time of the sampling pulse can be determined from the relationship between the amount of current change which occurs at the start of sampling, and the transient change in the on-resistance Ron of the switch. However, this is only an example, and the suitable transition time is changed by, for example, the length of the horizontal transfer period, or the like.

Note that the present embodiment has been described, as shown in FIG. 9, by taking the source follower circuit of the pixel as an example of the amplifier which performs the charging and discharging of the holding circuit. However, the present embodiment is not limited to such circuit. For example, a circuit other than the source follower may also be used as the amplifier for performing the charging and discharging of the holding capacitor, and this is the same for the subsequent embodiments.

Further, in the timing chart shown in FIG. 8, the sampling pulse during the horizontal transfer period are set to have the long rising and decaying transition times which are equal to each other, but the present embodiment is not limited to this. For example, in the circuit shown in FIG. 7, even when the sampling pulses pTN and pTS transition to the low level, the current flowing through the power supply is almost not changed, and the noise is hardly generated. Thus, it is not necessary that the transition time equal to the rising transition time is also applied as the decaying time of the sampling pulses. Therefore, even when the present embodiment is applied only to one of the rising and decaying transition times of the sampling pulse during the horizontal transfer period, the same effect as that described above can be obtained depending on a circuit configuration. This is the same for the subsequent embodiments.

Further, the present embodiment is based on the premise that the horizontal transfer period is longer than the time required for the vertical transfer. This is the same for the subsequent embodiments.

Note that, for the sake of brevity of description, the solid-state imaging apparatus shown in FIG. 7 is simplified to the pixel array 100 configured by pixels arranged in three rows and four columns. However, the present embodiment is not limited to this, and the number of rows and columns of the pixel array can be changed as required.

Second Embodiment

Figure 10A:
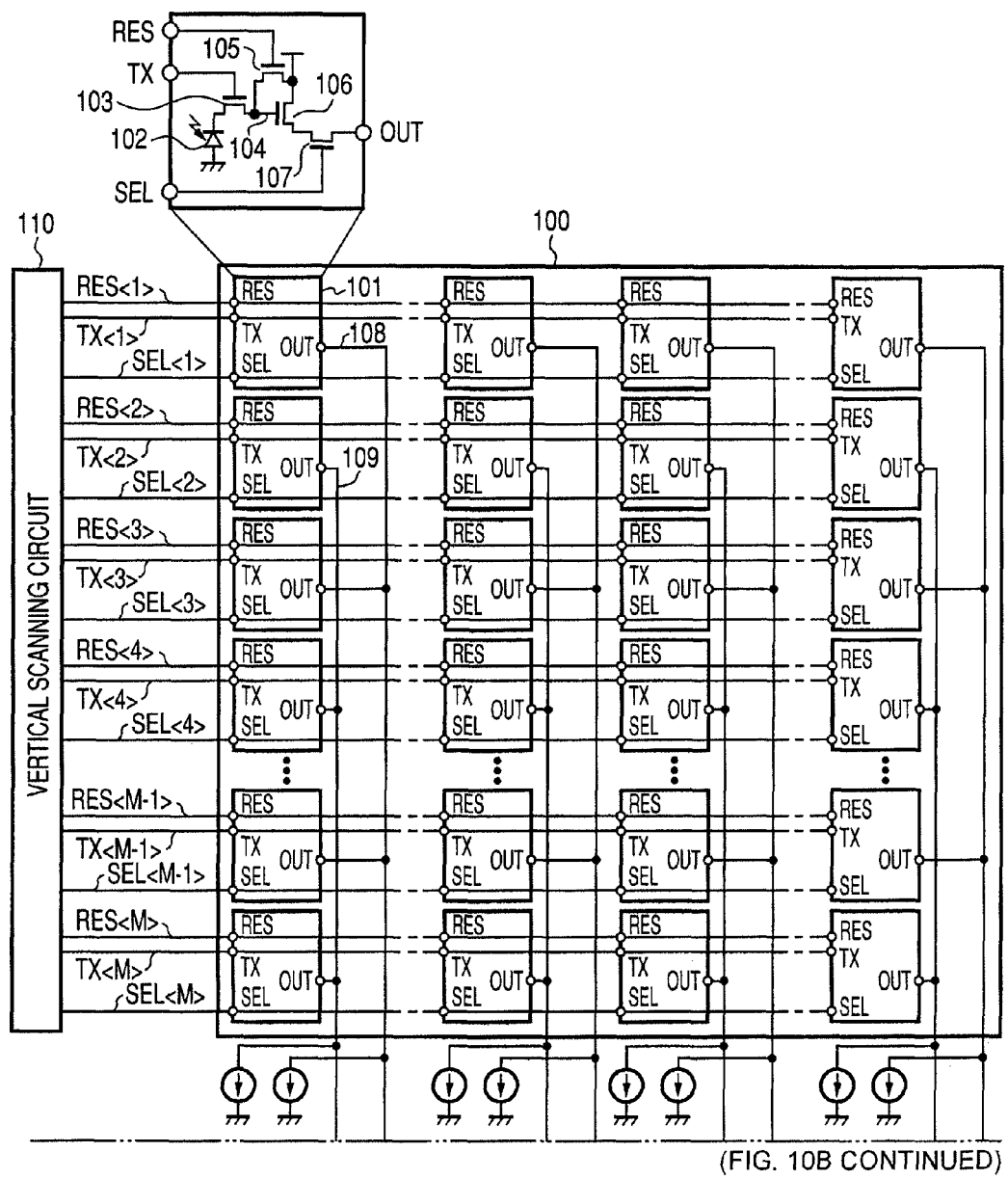
FIG. 10A and FIG. 10B together form FIG. 10, which shows a schematic block diagram illustrating a configuration example of a solid-state imaging apparatus according to a second embodiment of the present invention.
Figure 10B:
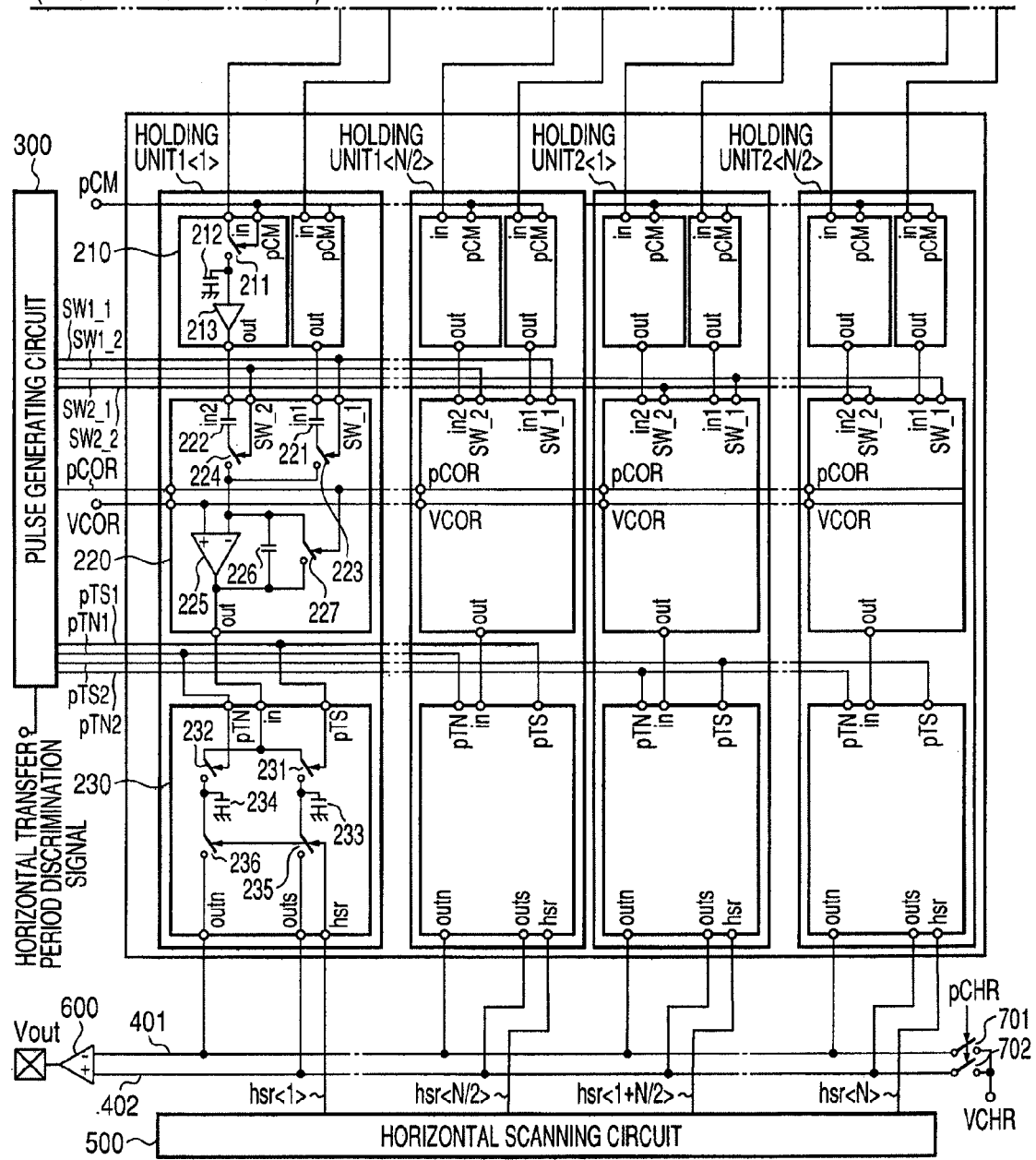

FIG. 10 shows a solid-state imaging apparatus according to a second embodiment of the present invention. In FIG. 10, the pixel array 100 is configured by pixels 101 arranged in M rows and N columns (where M and N are integers). Note here that the configuration of the pixel 101 is different from the configuration according to the first embodiment, and is configured as a four Tr type pixel including a transfer Tr 103 and a FD (floating diffusion) 104.

The outputs of the pixels 101 are output by vertical output lines 108 and 109 provided for each column, in such a manner that the output of the pixel 101 of an odd-numbered row and the output of the pixel 101 of an even-numbered row are respectively output by the separate signal lines. The holding circuit 200 is configured by (N/2) holding units 1 which are respectively provided for each column from the first column to the (N/2)th column, and (N/2) holding units 2 which are respectively provided for each column from the (1+N/2)th column to the Nth column. The vertical output lines 108 and 109 are connected to each one of the holding unit 1 and the holding unit 2 which correspond to the respective columns.

Each of the holding unit 1 and the holding unit 2 is configured by two intermediate memories 210 which respectively hold the pixel signals input from the vertical output lines 108 and 109, an amplifier circuit 220 which amplifies the pixel signal and cancels the noise, and the line memory 230 which hold the output of the amplifier circuit 220.

The intermediate memory 210 is configured by a switch 211 controlled by a signal pCM, a holding capacitor 212, and a buffer circuit 213. The output of the buffer circuit 213 is input into the amplifier circuit 220.

The outputs from the two intermediate memories 210 are connected to clamp capacitors 221 (Cc1) and 222 (Cc2) in the amplifier circuit 220, respectively. The amplifier circuit 220 is configured, as a switched capacitor amplifier using VC0R as a reference potential, by an operational amplifier 225, a feed back capacitor (Cf) 226, a reset switch 227 which is controlled by a signal pC0R, and the clamp capacitors 221 and 222. Shorting switches 223 and 224 controlled by signals SW1_1 and SW1_2 or signals SW2_1, and SW2_2 are connected to the terminals of the clamp capacitors 221 and 222, which terminals are other than the terminals respectively connected with the outputs from the intermediate memory 210. The negative input terminal of the operational amplifier 225 is commonly connected to the nodes of the shorting switches 223 and 224, which nodes are other than the nodes connected to the clamp capacitors 221 and 222. The pixel signal amplified by this switched capacitor amplifier is output to the line memory 230.

The pixel signal amplified by the amplifier circuit 220 and the noise signal generated in the amplifier circuit 220 are respectively held in the holding capacitors 233 and 234 provided in the line memory 230. The signals held in the holding capacitors 233 and 234 are transferred to the differential amplifier circuit 600 via the horizontal common output lines 401 and 402. The differential amplifier circuit 600 takes a difference between the pixel signal and the noise signal, so as to amplify the difference, and then outputs the amplified difference to the outside of the chip.

Figure 11:
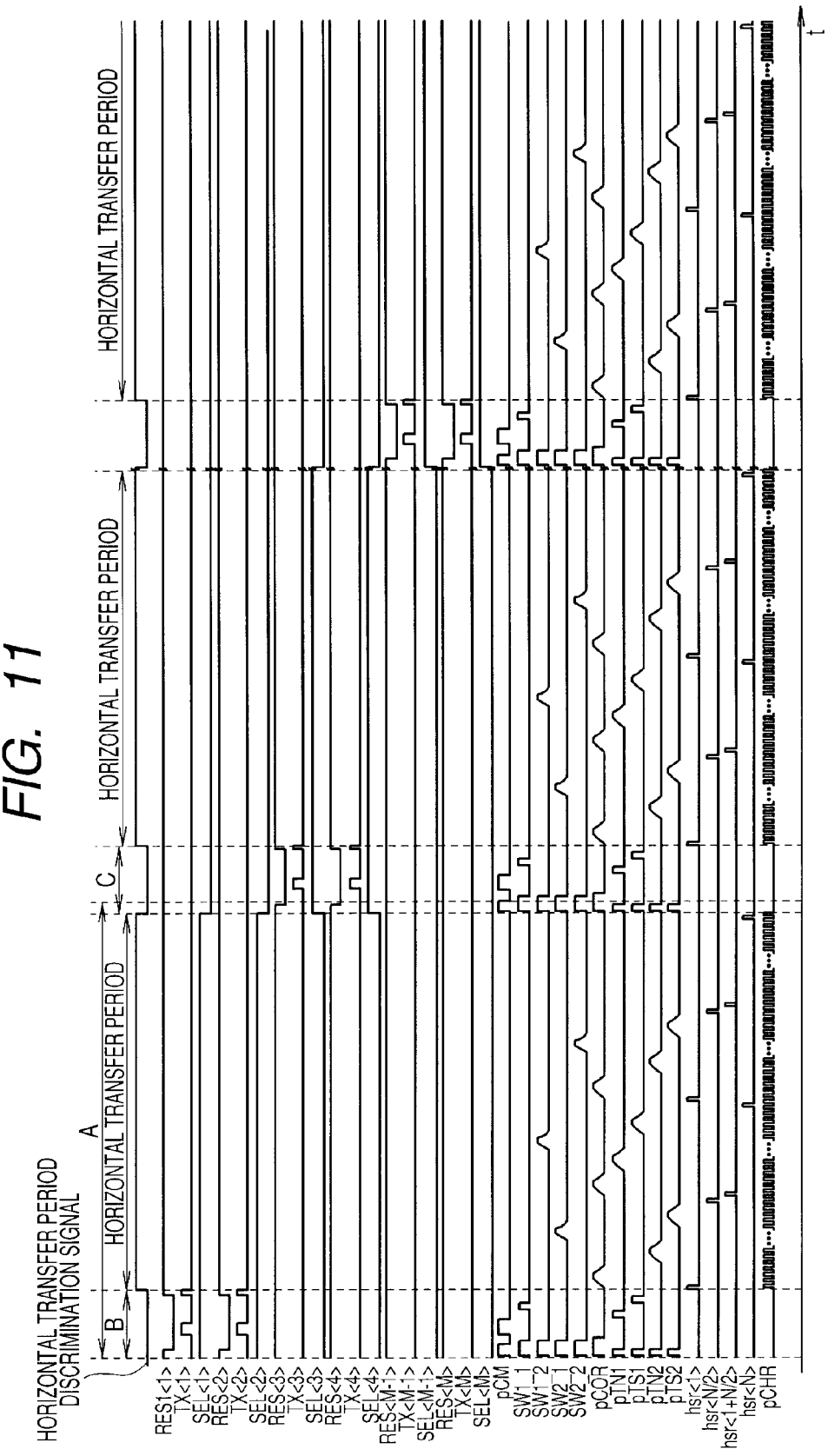
FIG. 11 is a timing chart of the operation of the circuit of FIG. 10.
Figure 12:
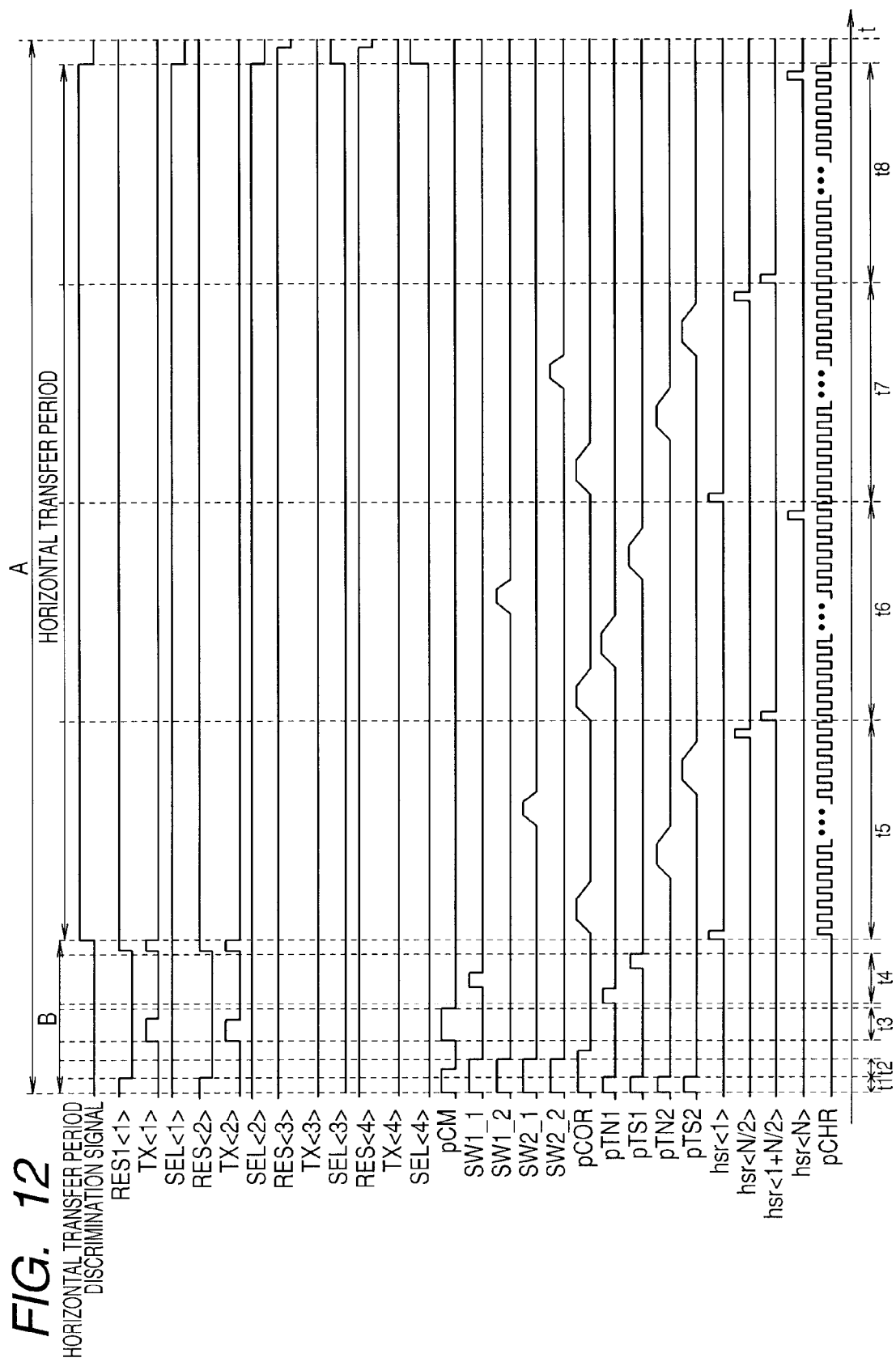
FIG. 12 is an enlarged view of the period indicated by "A" in the timing chart of FIG. 11.

FIG. 11 and FIG. 12 are drive timing charts showing the driving method of the solid-state imaging apparatus of FIG. 10. Note that FIG. 11 is a timing chart showing the reading operation of the pixels from the first row to the Mth row of the solid-state imaging apparatus of FIG. 10, and FIG. 12 shows in more detail the period indicated by "A" in FIG. 11.

In FIG. 12, the FD 104 of each of the pixels 101 of the first and second rows, and the holding circuit 200 are first reset during the period of t1. When reset signals RES<1> and RES<2> are set to the high level, the reset Tr 105 of each of the pixels 102 of the first and second rows is turned on, so that the FD 104 is reset.

Thereafter, the reset signals of the pixels 101 of the first and second rows are clamped in the clamp capacitors 221 and 222 during the period of t2, respectively. Then, during the period of t3, the pixel signal charges are transferred from the PD 102 to the FD 104 in each of the pixels of the first and second rows, and the pixel signals of the first and second rows are respectively sampled and held in the intermediate memories 210. During the period of t4, the noise signal generated in the amplifier circuit 220 is first sampled and held in the noise signal holding capacitor 234. Thereafter, the signal SW1_1 is set to the high level to amplify (Cc1/Cf times) the difference between the pixel signal of each of the pixels 101 from the first column to the (N/2)th column of the first row and the reset signal, and the resultant pixel signal is sampled and held in the pixel signal holding capacitor 233. Here, reference character Cc1 denotes the capacitance value of the clamp capacitor 221, and reference character Cf denotes the capacitance value of the feed back capacitor 226.

After the period of t4, the PD 102 of each of the pixels 101 of the first and second rows is reset, and then the horizontal transfer of the pixel signal and the noise signal which are held in the line memory 230 of the holding unit 1 is started. At this time, as shown in the period of t5, in parallel with the horizontal transfer from the holding unit 1, the vertical transfer of the pixel signals from the (1+N/2)th column to the Nth column of the first row is performed in the holding unit 2. During the period of t6, in parallel with the horizontal transfer from the holding unit 2, the vertical transfer of the pixel signals from the first column to the (N/2)th column of the second row is performed in the holding unit 1. During the period of t7, in parallel with the horizontal transfer from the holding unit 1, the vertical transfer of the pixel signals from the (1+N/2)th column to the Nth column of the second row is performed in the holding unit 2. Thereafter, the horizontal transfer from the holding unit 2 is performed during the period of t8, so that a series of operations in connection with the reading of the pixel signals of the first and second rows are completed. As shown in FIG. 11, the reading operations of the third row and the rows subsequent to the third row are performed similarly to the above described operations. When the reading operations of the pixel signals of up to the Mth row are completed, the process returns to the first row.

Here, the transition time of the sampling pulse input into the holding circuit 200 is compared between the horizontal transfer period and the period indicated by B shown in FIG. 11 and FIG. 12. Note that the "sampling pulse" described here is not limited to the pulses, such as pTS1, pTN1, pTS2 and pTN2, which are used to sample and hold the pixel signal and the noise signal in the specific holding capacitor. In the sampling according to the present embodiment, it is assumed that all operations to enable not only the pixel signal but also a specific signal level at a certain time to be stored in the capacitor element in the holding circuit 200 are regarded as the sampling operation, and that all the pulses used to perform the operations are defined as the sampling pulses. This is the same for the other embodiments. For example, the pulse, such as pC0R, used to reset the output of the amplifier circuit 220 to VC0R is also regarded as the sampling pulse for sampling the potential based on VC0R in the feed back capacitor 226. This is the same for pCM, SW1_1, SW1_2, SW2_1 and SW2_2.

From FIG. 11 and FIG. 12, it can be seen that the transition time of the sampling pulses (pTS1, pTN1, pTS2, pTN2, SW1_1, SW1_2, SW2_1, SW2_2, pC0R) during the horizontal transfer period is set longer than the transition time of the sampling pulses during the period of B. In this case, because of the same reason as in the first embodiment according to the present invention, the transition time of the sampling pulse is set short during the period (blanking period) which is indicated by B and other than the horizontal transfer period, and in which the output signal at the time of the horizontal transfer period is hardly influenced by the sampling pulse. Further, the transition time of the sampling pulse during the horizontal transfer period, which pulse causes a change in the power supply voltage by the transition of itself so as to mix a noise into the output signal, is set longer than the transition time during the period of B in order to suppress the change in the power supply voltage.

In this way, the transition time of the sampling pulse of the vertical transfer is set long during the horizontal transfer period and is set short during the blanking period. Thereby, the same effect as that of the embodiment shown in FIG. 7 can also be obtained in the embodiment shown in FIG. 10.

Note that the present embodiment has the configuration and operation based on the assumption that two rows are simultaneously read, but the present embodiment is not limited to this.

Further, a part of or all of the sampling operations, except for those based on the sampling pulses pTS2 and pTN2, in the holding circuit 200 during the period indicated by C in FIG. 11 may be performed during the period indicated by t8 in FIG. 12 in which period the last horizontal transfer is performed. For example, the operations in connection with the sampling pulses (pCM, pTS1, pTN1, SW1_1, SW1_2, SW2_1, SW2_2, pC0R) during the period of C are set to be performed during the period of t8, and the transition time of the sampling pulses during the period of t8 is set long. Further, the transition time of these sampling pulses during the period of B is left shorter than the transition time during the period of t8, whereby it is possible to obtain the same effect as the above described effect according to the present embodiment.

Third Embodiment

Figure 13A:
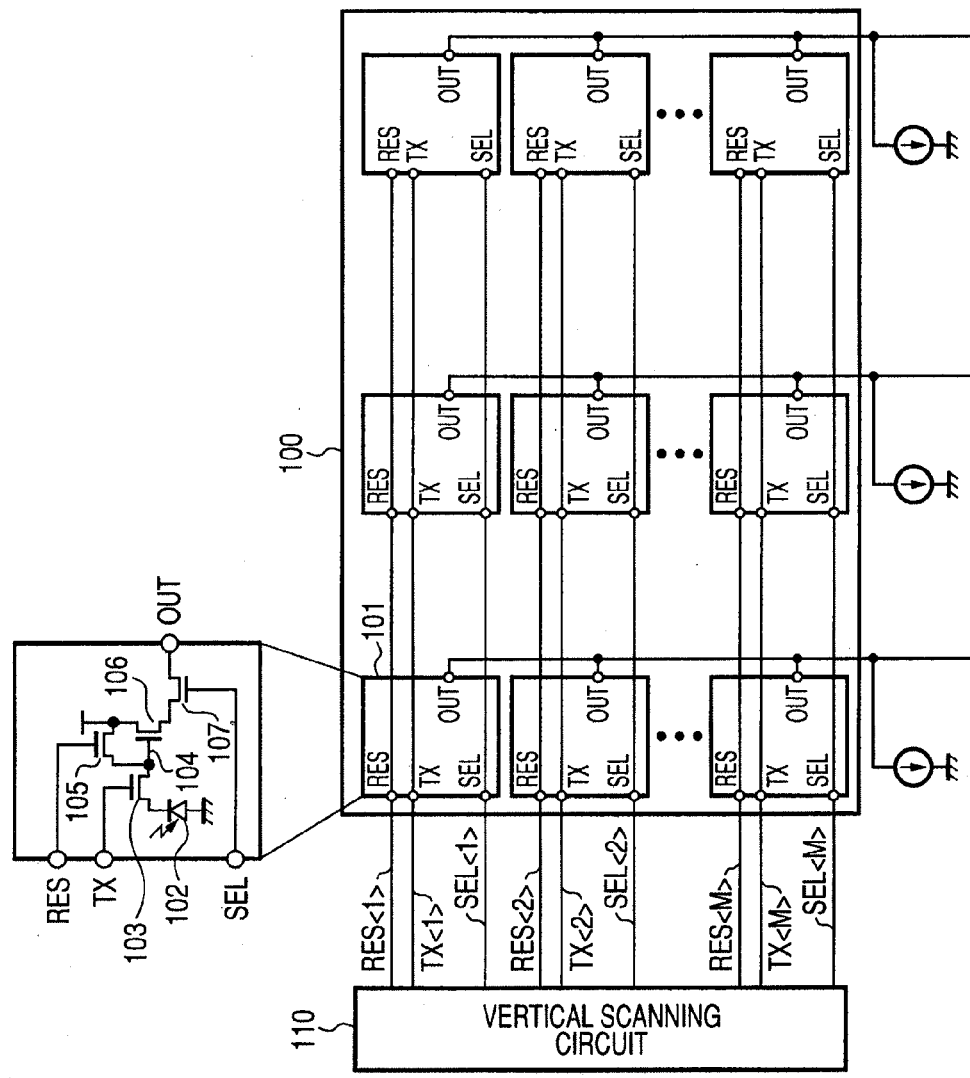

FIG. 13 shows a solid-state imaging apparatus according to a third embodiment of the present invention. However, only the difference from the first and second embodiments will be described here. In FIG. 13, the holding circuit 200 is configured by N holding units 1 each of which is provided for each column and each of which is configured by the amplifier circuit 220 and a first line memory 250, and N holding units 2 each of which is similarly provided for each column and each of which is configured by a second line memory 260.

Figure 14:
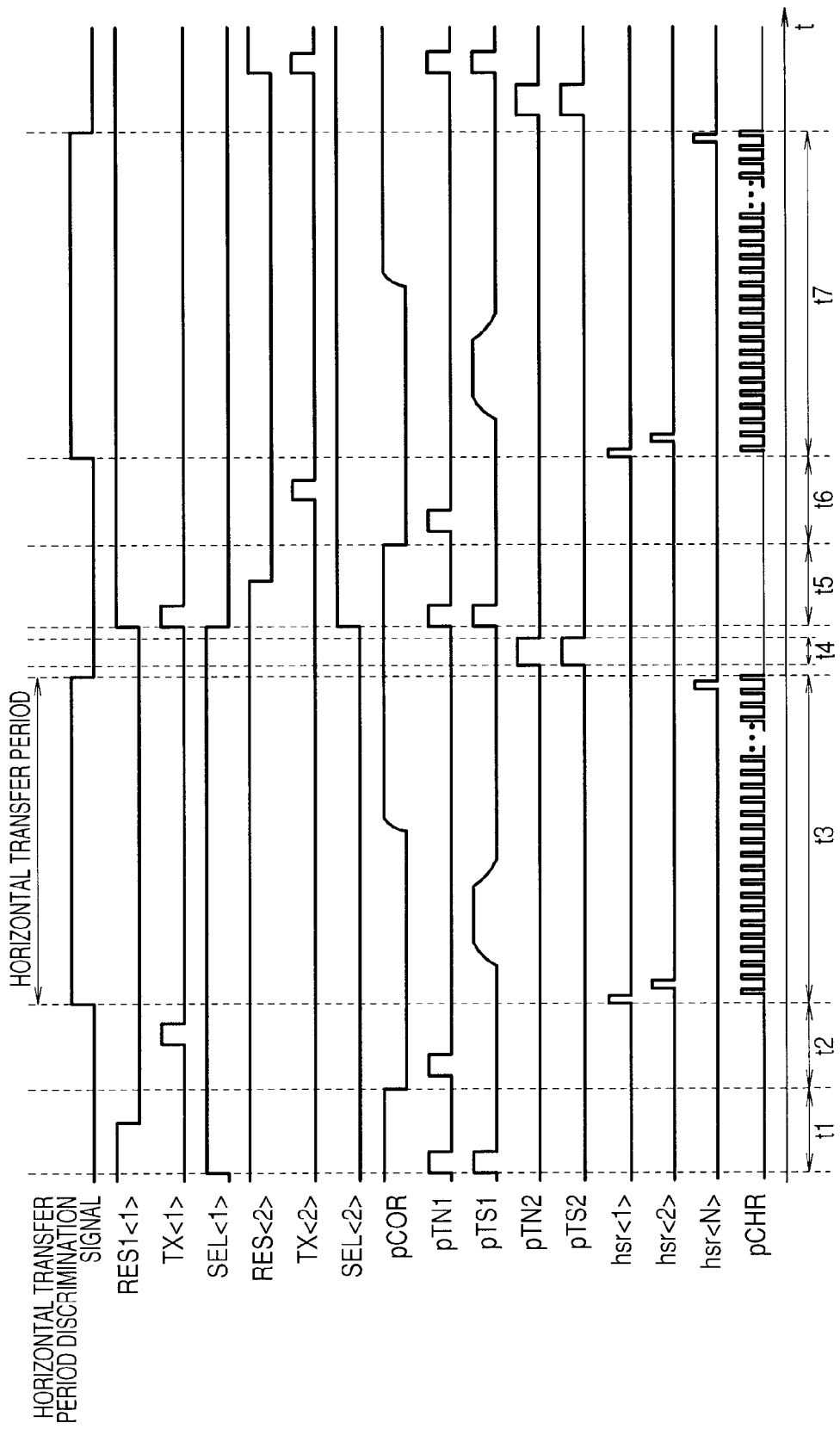
FIG. 14 is a timing chart of the operation of the circuit of FIG. 13.

FIG. 14 is an operation timing chart showing a driving method of the solid-state imaging apparatus of FIG. 13. In FIG. 14, during the period of t1, the first line memory 250 is reset, and the reset level of the pixel of the first row is clamped in a clamp capacitor 229.

In the period of t2, the noise level of the amplifier circuit 220 is sampled and held in a first noise signal holding capacitor 254 (Ctn1) in the first line memory 250 by a sampling switch 252. Thereafter, the pixel signal charges are transferred from the PD 102 to the FD 104 in each of the pixels of the first row.

After the pixel reading operation during the periods of t1 and t2 is ended, during the period of t3, the pixel signal is sampled and held in a first pixel signal holding capacitor 253 (Cts1) in the first line memory 250 by a sampling switch 251, and the amplifier circuit 220 is reset. At this time, the Mth row pixel signal and the noise signal of the previous frame, which are respectively held in a second pixel signal holding capacitor 263 (Cts2) and a second noise signal holding capacitor 264 (Ctn2) in the second line memory 260, are also simultaneously horizontally transferred by horizontal transfer switches 265 and 266, respectively.

When the horizontal transfer during the period of t3 is ended, during the period of t4, the pixel signal and the noise signal of the first row, which are held in the first line memory 250, are written in the second line memory 260 by sampling switches 261 and 262 via buffer amplifiers 255 and 256.

Thereafter, during the period of t5, the first line memory 250 is reset, and the reset level of the pixel of the second row is clamped in the clamp capacitor 229. During the period of t6, the noise level of the amplifier circuit 220 is sampled and held in the first noise signal holding capacitor 254, and the pixel signal charges of the pixel 101 of the second row are transferred.

Then, the horizontal transfer of the pixel signal and the noise signal of the first row which are written beforehand in the second line memory 260, the sampling and holding of the pixel signal of the second row with the first pixel signal holding capacitor 253, and the reset of the amplifier circuit 220 are simultaneously performed during the period of t7.

In this way, the solid-state imaging apparatus according to the present embodiment is provided with the two holding units, such as the holding unit 1 for performing the vertical transfer, and the holding unit 2 for performing the horizontal transfer, which have different roles, and thereby is capable of simultaneously performing the horizontal transfer and the vertical transfer as shown in the periods of t3 and t7 in FIG. 14.

Here, attention is directed to the transition time of pC0R and pTS1 during the periods of t1 and t3. During the period of t1 in which the horizontal transfer is not performed, the transition time of pC0R and pTS1 are set short. During the period of t3 in which the horizontal transfer is performed, the transition time of pC0R and pTS1 are set longer than the transition time of pC0R and pTS1 during the period of t1. In this way, the transition time of the sampling pulse is set long during the horizontal transfer period and is set short during a period other than the horizontal transfer period. Thereby, it is possible to obtain the same effect as that described by referring to the first and second embodiments.

Note that analog signal outputs are assumed in the solid-state imaging apparatuses as described in the first, second and third embodiments, but the present invention is not limited to this. The present invention is useful for a solid-state imaging apparatus in which digital signal outputs are assumed and which is configured, for example, as shown in FIG. 15, by including the holding circuit 200 that uses an analog memory and a column ADC (analogue-digital converter) as the holding unit 1 and that uses a digital memory as the holding unit 2.

As described above, the solid-state imaging apparatus according to the first to third embodiments includes the plurality of pixels 101, the pulse generator circuit 300, the holding circuit 200, and the horizontal scanning circuit 500. Each of the plurality of pixels 101 includes the photoelectric conversion unit (photodiode) 102 which generates a pixel signal by photoelectric conversion. The pulse generator circuit 300 generates the sampling pulse pTS1, and the like. The holding circuit 200 includes the first holding unit 1 and the second holding unit 2 which hold the pixel signal of the pixel 101 by using the sampling pulse pTS1, and the like. The horizontal scanning circuit 500 outputs the pixel signal held in the holding circuit 200 to the horizontal common output lines 401 and 402.

The period from the time when the output of first one of the pixel signals from the holding circuit 200 to the horizontal common output lines 401 and 402 is started to the time when the output of the last one of the pixel signals is completed is assumed as the horizontal scanning period. While the pixel signal is written in the first holding unit 1 during the horizontal scanning period, the horizontal scanning circuit 500 outputs the other pixel signal held in the second holding unit 2 to the horizontal common output lines 401 and 402. The transition time of the edge of the sampling pulse during the horizontal scanning period is set longer than the transition time of the edge of the sampling pulse during the period other than the horizontal scanning period.

Further, only the transition time of one of the rising edge and the decaying edge of the sampling pulse during the horizontal scanning period may be set longer than the transition time of the rising edge and the decaying edge of the sampling pulse during the period other than the horizontal scanning period.

Further, in FIG. 7, and the like, the first holding units 1 and the second holding units 2 are connected to the horizontal common output lines 401 and 402 in parallel to each other by using each of the horizontal common output lines 401 and 402 as a common node.

Further, in FIG. 13, the first holding unit 1 and the second holding unit 2 are connected in series between the pixels 101 and the horizontal common output lines 401 and 402.

According to the first to third embodiments, it is possible to obtain a good quality image by suppressing the noise generated in synchronization with the sampling pulse at the time of vertical transfer while realizing a short blanking period. Thereby, the noise can be reduced, and the number of pixels as well as the pixel reading speed can be increased.

Note that any of the above described embodiments only shows a specific example for carrying out the present invention, and the technical scope of the present invention is not limited by the embodiments. That is, the present invention can be embodied in other various modes without departing from the technical idea or main feature of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-042898, filed Feb. 25, 2009, which is hereby incorporated by reference herein in its entirety.

What is claimed is:

1. A solid-state imaging apparatus comprising:
    a plurality of pixels each including a photoelectric conversion unit for generating a pixel signal by photoelectric conversion;
    a pulse generator circuit for generating a sampling pulse;
    a holding circuit including first and second holding units for holding the pixel signal according to the sampling pulse; and
    a horizontal scanning circuit for outputting, to a horizontal common output lines, the pixel signal held by the holding circuit, wherein
    a horizontal scanning period starts from outputting a first one of the pixel signals from the holding circuit to the horizontal scanning circuit until an end of the outputting a last one of the pixel signals
    during the horizontal scanning period, while the pixel signal is written in the first holding unit, the horizontal scanning circuits outputs, to the horizontal common output lines, the other pixel signal held by the second holding unit, and
    a transition time of an edge of the sampling pulse during the horizontal scanning period is set to be longer than a transition time of the edge of the sampling pulse during a time period except for the horizontal scanning period.

2. The solid-state imaging apparatus according to claim 1, wherein
    the transition time of only one of a pulse raising edge and a pulse decay edge of the sampling pulse during the horizontal scanning period is set to be longer than
    the transition time of the one of the pulse raising edge and the pulse decay edge of the sampling pulse that during the time period except for the horizontal scanning period.

3. The solid-state imaging apparatus according to claim 1, wherein
    the first and second holding units are connected in parallel through the horizontal common output lines as a common node.

4. The solid-state imaging apparatus according to claim 1, wherein
    the first and second holding units are connected in serial between the pixel and the horizontal common output lines.

5. A method of driving a solid-state imaging apparatus comprising:
    a plurality of pixels each including a photoelectric conversion unit for generating a pixel signal by photoelectric conversion;
    a pulse generator circuit for generating a sampling pulse;
    a holding circuit including first and second holding units for holding the pixel signal according to the sampling pulse; and
    a horizontal scanning circuit for outputting, to a horizontal common output lines, the pixel signal held by the holding circuit, wherein
    a horizontal scanning period starts from outputting a first one of the pixel signals from the holding circuit to the horizontal scanning circuit until an end of the outputting a last one of the pixel signals, and wherein the method comprising steps of:
    during the horizontal scanning period, while writing the pixel signal in the first holding unit, outputting, from the horizontal scanning circuits outputs, to the horizontal common output lines, the other pixel signal held by the second holding unit, and
    controlling a transition time of an edge of the sampling pulse during the horizontal scanning period, to be longer than a transition time of the edge of the sampling pulse during a time period except for the horizontal scanning period.

* * * * *